S. BARTON.
ICE CYCLE.
APPLICATION FILED MAR. 29, 1916.
Patented Apr. 2, 1918.
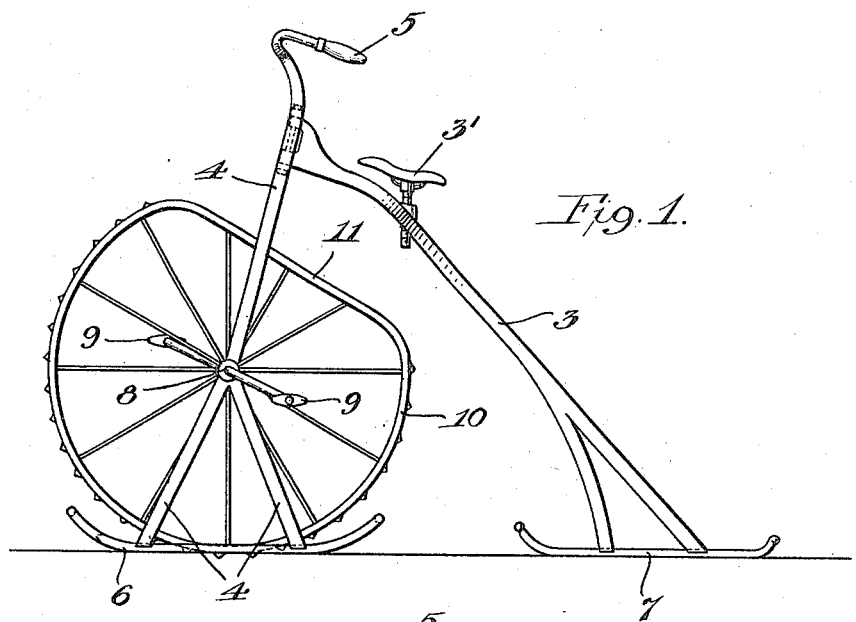
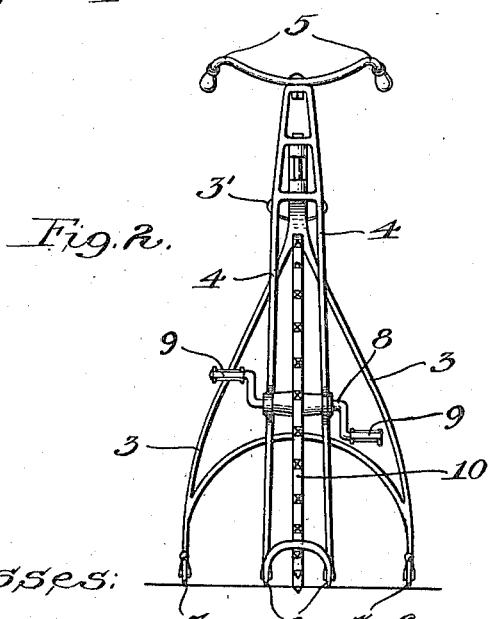
Inventor,
Samuel Barton

UNITED STATES PATENT OFFICE.

SAMUEL BARTON, OF BROOKLYN, NEW YORK.

ICE-CYCLE.

1,261,203.  Specification of Letters Patent.  Patented Apr. 2, 1918.

Application filed March 29, 1916. Serial No. 87,641.

*To all whom it may concern:*

Be it known that I, SAMUEL BARTON, a citizen of the United States, and a resident of the city of Brooklyn, county of Kings, and State of New York, have invented certain new and useful Improvements in Ice-Cycles, of which the following is a specification.

My invention relates to improvements in ice cycles, and has for its object the provision of an improved construction of this character for traveling on the ice.

The invention consists in the combinations and arrangements of parts hereinafter described and claimed.

The invention will be best understood by reference to the accompanying drawing forming a part of this application, and in which, Figure 1 is a side view of a construction embodying my invention, and Fig. 2, a front elevation of the same.

The preferred form of construction, as illustrated in the drawing, comprises a rear frame 3, in substantially the general form of the rear frame of a velocipede, provided with a suitable saddle or seat 3' and pivotally connected at its forward end with a steering fork frame 4 having steering handles 5. A runner frame 6 is secured to the lower ends of the fork frame 4, said runner frame being formed from a single rod bent to form a frame open centrally and having runners at each side thereof. The frame 3 is bifurcated at its lower rear portion and each bifurcation is itself bifurcated and provided with a runner 7 at the lower end of each bifurcation, the frames 3 and 4 constituting in effect an ordinary velocipede mounted upon runners instead of wheels.

A crank shaft 8 is mounted in the fork frame 4 and equipped with suitable pedals 9 for operating the same. A toothed segmental driving wheel 10 is mounted on crank shaft 8 to contact with the ice between the sides of frame 6, one portion 11 of said wheel being flattened, as indicated, to avoid contact with the ice.

In use, the driving wheel 10 is operated by means of the pedals 9 as in an ordinary velocipede. Wheel 10 will contact with the surface of the ice for the major portion of its revolution thus driving the cycle forwardly and then release itself from engagement with the ice permitting the cycle to coast under the influence of its inertia. When more motion is desired, the wheel 10 is rotated again, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A device of the class described comprising a main frame divided at the rear and provided with a runner at the lower end of each bifurcation; a steering fork at the front end of said frame pivotally connected therewith; a runner frame secured to the lower ends of said steering fork, said frame being open centrally and provided with a runner at each side; a crank shaft mounted in said fork; and a toothed segmental driving wheel on said crank shaft engaging the supporting surface between the sides of said runner frame, substantially as described.

In testimony whereof I have signed my name to this specification in the presence of two subscribing witnesses.

SAMUEL BARTON.

Witnesses:
 B. H. POORMAN,
 W. J. FENTON.

Copies of this patent may be obtained for five cents each, by addressing the "Commissioner of Patents, Washington, D. C."